(12) United States Patent
Shigeta

(10) Patent No.: US 11,229,833 B2
(45) Date of Patent: *Jan. 25, 2022

(54) SHUFFLED PLAYING CARD AND METHOD OF MANUFACTURING PLAYING CARD

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,322

(22) Filed: Feb. 27, 2020

(65) Prior Publication Data

US 2020/0261787 A1  Aug. 20, 2020

Related U.S. Application Data

(63) Continuation of application No. 16/134,689, filed on Sep. 18, 2018, now Pat. No. 10,610,766.

(30) Foreign Application Priority Data

Sep. 22, 2017 (JP) .................. 2017-182036

(51) Int. Cl.
*A63F 1/02* (2006.01)
*G07F 17/32* (2006.01)
(Continued)

(52) U.S. Cl.
CPC .................. *A63F 1/02* (2013.01); *A63F 1/12* (2013.01); *A63F 1/18* (2013.01); *G07F 17/3241* (2013.01);
(Continued)

(58) Field of Classification Search
CPC .......... A63F 2250/58; A63F 2009/2419; A63F 2009/242; A63F 1/062; A63F 3/0655;
(Continued)

(56) References Cited

U.S. PATENT DOCUMENTS 4,817,528 A   4/1989  Baker
5,188,370 A   2/1993  Vlahos
(Continued)

FOREIGN PATENT DOCUMENTS

AU   2011294601 A1   1/2013
AU   2014413384 A1   7/2017
(Continued)

OTHER PUBLICATIONS

International Search Report dated Dec. 13, 2016 in corresponding PCT/JP2016/077115 cites the patent documents above.
(Continued)

*Primary Examiner* — Benjamin Layno
(74) *Attorney, Agent, or Firm* — Norton Rose Fulbright US LLP

(57) ABSTRACT

There is provided a shuffled playing card, wherein a suit and a rank are printed on one surface of a card base sheet, and a back pattern is printed on another surface, different sheet IDs for one card base sheet or each of a plurality of card base sheets are printed on the card base sheet, one deck or a plurality of decks are formed by individual cards cut by a cutting machine from the card base sheet, the one deck or the plurality of decks are shuffled by a shuffle machine to form a set of shuffled playing cards, different shuffled playing card IDs for each set are assigned to the shuffled playing card as ID codes, and the sheet ID of the playing card constituting the shuffled playing card and the shuffled playing card ID are associated with each other in a database.

16 Claims, 7 Drawing Sheets

(51) Int. Cl.
  *A63F 1/18* (2006.01)
  *A63F 1/12* (2006.01)
  *A63F 1/06* (2006.01)
  *A63F 9/24* (2006.01)
  *A63F 3/06* (2006.01)

(52) U.S. Cl.
  CPC .......... *G07F 17/3293* (2013.01); *A63F 1/062* (2013.01); *A63F 3/0655* (2013.01); *A63F 2001/022* (2013.01); *A63F 2001/027* (2013.01); *A63F 2009/242* (2013.01); *A63F 2009/2419* (2013.01); *A63F 2250/52* (2013.01); *A63F 2250/58* (2013.01)

(58) Field of Classification Search
  CPC ................ A63F 3/065; A63F 2001/022; A63F 2001/027; A63F 1/02; A63F 1/12
  USPC .............................. 273/292, 139, 138.1, 293
  See application file for complete search history.

(56) References Cited

U.S. PATENT DOCUMENTS

| | | | |
|---|---|---|---|
| 5,259,907 | A | 11/1993 | Soules et al. |
| 8,371,583 | B2* | 2/2013 | Shigeta ............... A63F 1/12 273/149 R |
| 9,314,689 | B2 | 4/2016 | Chun |
| 10,022,618 | B2 | 7/2018 | Shigeta |
| 10,610,766 | B2* | 4/2020 | Shigeta ............ G07F 17/3241 |
| 2001/0031660 | A1* | 10/2001 | Wilk ................ A63F 3/0645 463/19 |
| 2004/0026636 | A1* | 2/2004 | Shigeta ............... A63F 1/02 250/556 |
| 2004/0226636 | A1* | 11/2004 | Bampton ............ C22C 49/02 148/679 |
| 2004/0259618 | A1 | 12/2004 | Soltys et al. |
| 2008/0230991 | A1 | 9/2008 | Lutnick et al. |
| 2010/0314834 | A1 | 12/2010 | Shigeta |
| 2010/0327525 | A1 | 12/2010 | Shigeta |
| 2013/0292902 | A1 | 11/2013 | Shigeta |
| 2014/0033660 | A1 | 2/2014 | Shigeta |
| 2014/0309006 | A1 | 10/2014 | Shigeta |
| 2015/0238849 | A1 | 8/2015 | Shigeta |
| 2015/0290527 | A1 | 10/2015 | Shigeta |
| 2016/0263469 | A1 | 9/2016 | Shigeta |
| 2017/0106270 | A1 | 4/2017 | Shigeta |

FOREIGN PATENT DOCUMENTS

| | | |
|---|---|---|
| CN | 201020743 Y | 2/2008 |
| CN | 103143162 A | 6/2013 |
| CN | 101873380 A | 9/2013 |
| CN | 103287637 A | 9/2013 |
| CN | 104027971 A | 9/2014 |
| CN | 104096352 A | 10/2014 |
| CN | 104661714 A | 5/2015 |
| CN | 105935490 A | 9/2016 |
| CN | 105944374 A | 9/2016 |
| EP | 2228106 A1 | 9/2010 |
| ES | 2567275 T3 | 4/2016 |
| JP | 2008012360 A | 1/2008 |
| JP | 2008229350 A | 10/2008 |
| JP | 2011024603 A | 2/2011 |
| JP | 2014094256 A | 5/2014 |
| JP | 2015197903 A | 11/2015 |
| JP | 2016129626 A | 7/2016 |
| JP | 2016129627 A | 7/2016 |
| JP | 2016140934 A | 8/2016 |
| TW | 201332620 A1 | 8/2013 |
| WO | 2009/069708 A1 | 6/2009 |
| WO | 2012026131 A1 | 3/2012 |

OTHER PUBLICATIONS

First Examination Report dated Aug. 29, 2018 in New Zealand patent application No. 740604 cites the patent documents above.
Office Action dated Aug. 6, 2019 in Japanese patent application No. 2018-169522 cites the patent documents above.
Office Action dated Sep. 3, 2019 in Macao application No. I/1585 cites the patent documents above.
Search Report dated Jul. 24, 2019 in Filipino Application No. 1/2018/000274 cites the patent documents above.
International Search Report Report dated Oct. 30, 2018 in PCT application No. PCT/JP20181034121.
European Search Report Report dated Nov. 30, 2018 in European application No. 18195791.1.
Filipino Office Invention Publication dated May 17, 2021 issued for PH application No. 1/2020/050540 cited the patent documents above.
Chinese Office Action dated Sep. 15, 2021 issued for CN application No. 201811096536.2.
Japanese Office Action dated Oct. 5, 2021 issued for JP application No. 2020-199279.

* cited by examiner

FIG.8

| SHUFFLE PLAYING CARD ID | SHEET ID | PRINTING DATE | CUTTING DATE |
|---|---|---|---|
| AB0004 | 00001 | 20170801 | 20170803 |
| | 00002 | 20170801 | 20170804 |
| | 00003 | 20170801 | 20170804 |
| | 00004 | 20170801 | 20170804 |
| AB0005 | 00005 | 20170801 | 20170804 |
| | 00006 | 20170802 | 20170804 |
| | 00007 | 20170802 | 20170804 |
| | 00009 | 20170802 | 20170805 |
| ⋮ | ⋮ | ⋮ | ⋮ |

SHUFFLED PLAYING CARD AND METHOD OF MANUFACTURING PLAYING CARD

CROSS REFERENCE TO RELATED APPLICATION

The present application is a continuation from U.S. application Ser. No. 16/134,689 filed Sep. 18, 2018, now U.S. Pat. No. 10,610,766, which claims priority to JP Application No. 2017-182036 filed Sep. 22, 2017, the entire contents of each of which are incorporated herein by reference.

BACKGROUND

Technical Field

The present invention relates to a shuffled playing card and a method of manufacturing a playing card.

Related Art

In various playing card games such as poker, baccarat, bridge, and blackjack, a dealer sets playing cards of one deck or a plurality of decks on a card shooter and the like, delivers the playing cards one by one from the card shooter, and distributes the playing cards to a game participant. At this time, in order to guarantee fairness of the game, these cards need to be distributed randomly, so a game sponsor needs to sufficiently shuffle the playing cards randomly before setting the playing cards on the card shooter.

However, when the game sponsor performs shuffling prior to the game, it may take a long time to shuffle cards, which is a factor of hindering an efficient operation of a game. In addition, when the game sponsor performs shuffling, there is a problem in that there is room to perform fraudulent acts such as inserting and removing cards and replacing cards.

In order to solve such a problem, WO 2009/069708 discloses shuffled playing cards individually packaged in a state in which playing cards constituting a predetermined number of decks are shuffled. In the packaging of the shuffled playing card, a shuffled playing card ID for accessing information, which can specify a shuffle machine or a shuffle machine group shuffling the shuffled playing card, on database is assigned as an ID code.

SUMMARY

However, even if the ID code is assigned to the packaging of the shuffled playing card, when contents are replaced with a set of cards whose arrangement is known, there is no means for ascertaining whether these cards are genuine products, such that even fraudulent acts performed in a game using the set of cards cannot be found.

An object of the present invention is to provide a shuffled playing card and a method of manufacturing a playing card capable of confirming whether or not a playing card is a genuine product correctly manufactured and distributed on a sheet basis of a card base sheet.

A method of manufacturing a playing card according to an aspect of the present invention includes: a printing step of printing a suit and a rank on one surface of a card base sheet and printing a back pattern on a back surface; a sheet ID assigning step of printing different sheet IDs for one card base sheet or each of a plurality of card base sheets on the card base sheet; and a cutting step of cutting the card base sheet having undergone the printing step and the sheet ID assigning step into individual cards by a cutting machine, wherein one deck or a plurality of decks are produced from the card base sheet.

According to this aspect, since the card base sheet on which the different sheet IDs are printed for one card base sheet or each of the plurality of card base sheets is cut to produce the playing card of one deck or a plurality of decks, it is possible to confirm, on the database, the information on when the card is printed and also when the card is inspected by tracing back through the distribution history of the playing card. As a result, it is possible to confirm whether the playing card is a genuine product correctly manufactured and distributed by reading the sheet ID from the contents of the card to confirm the history on the database even if the contents of the packaged shuffled playing card are replaced with a set of cards whose arrangement is known by malicious fraudulent players.

In addition, by printing different sheet IDs for each card base sheet or a plurality of card base sheets, the ID management of the card base sheet in the factory becomes possible. For example, even when the card base sheet is discarded halfway, it is possible to manage at which stage the playing card is discarded in the database. In this way, it is possible to grasp a yield in each process at the manufacturing stage. In addition, even if malicious fraudulent players illegally obtain the discarded card base sheet and cut the obtained card base sheet by themselves to produce a counterfeit card and bring the produced counterfeit card for use in a game, the sheet ID is read from the card to confirm the history on the database, thereby making it possible to easily detect that the playing card is a counterfeit card and enhance the security of the game.

In the method of manufacturing a playing card according to the aspect of the present invention, in the printing step, the suits and the ranks corresponding to one deck or the plurality of decks may be printed on one card base sheet, and a common picture pattern may be printed on the back surface, and in the sheet ID assigning step, the common sheet ID may be printed on the card base sheets corresponding to the one deck or the plurality of decks.

In the method of manufacturing a playing card according to the aspect of the present invention, the sheet ID may be printed on the card constituting the set of decks.

In the method of manufacturing a playing card according to the aspect of the present invention, the sheet ID may be printed on a card other than the card constituting the set of decks.

In the method of manufacturing a playing card according to the aspect of the present invention, the sheet ID may be printed with transparent UV ink.

The method of manufacturing a playing card according to the aspect of the present invention may further include: a shuffling step of shuffling a plurality of decks of the playing cards by a shuffle machine to produce a set of shuffled playing cards; a packaging step of packaging a set of shuffled playing cards having undergone the shuffling step; and an ID assigning step of assigning a shuffled playing card ID as an ID code to the set of shuffled playing cards by generating different shuffled playing card IDs for each set of shuffled playing cards.

The method of manufacturing a playing card according to the aspect of the present invention may further include: a database producing step of storing the shuffled playing card ID and the sheet ID assigned to the playing card constituting the shuffled playing card by associating the shuffled playing card ID and the sheet ID with each other in the database.

In the method of manufacturing a playing card according to the aspect of the present invention, in the database producing step, the sheet ID of the card base sheet may be stored in the database in association with one or both of recording of a printing date on the card base sheet and recording of a cut date on the individual playing card.

In the method of manufacturing a playing card according to the aspect of the present invention, in the database producing step, before the shuffling step, the sheet ID read from the playing card constituting the set of decks may be stored in the database in association with the shuffled playing card ID of the shuffled playing card to which the deck belongs.

There is provided a playing card according to an aspect of the present invention, wherein a suit and a rank are printed on one surface of a card base sheet, a back pattern is printed on a back surface, different sheet IDs for one card base sheet or each of a plurality of card base sheets are printed on the card base sheet, one deck or a plurality of decks are constituted by individual cards cut from the card base sheet by a cutting machine.

In the playing card according to the aspect of the present invention, the suit and the rank corresponding to one deck or the plurality of decks may be printed on the one card base sheet, a common back pattern may be printed on the back surface, and a common sheet ID may be printed on one deck or a set of the plurality of decks.

In the playing card according to the aspect of the present invention, the sheet ID may be printed on the playing card constituting the set of decks.

In the playing card according to the aspect of the present invention, the sheet ID may be printed on a card other than the playing card constituting the set of decks.

In the playing card according to the aspect of the present invention, the sheet ID may be printed with transparent UV ink.

In the playing card according to the aspect of the present invention, the sheet ID of the card base sheet may be associated with one or both of recording of a printing date on the card base sheet and recording of a cut date on the individual playing card in the database.

There is provided a shuffled playing card according to an aspect of the present invention, wherein a plurality of decks of the playing card having any of the above features are shuffled by a shuffle machine to form a set of shuffled playing cards, and different shuffled playing card IDs for each set are assigned to the shuffled playing card as ID codes.

In the shuffled playing card according to the aspect of the present invention, the sheet ID of the playing card constituting the shuffled playing card and the shuffled playing card ID may be associated with each other in the database.

There is provided a shuffled playing card according to an aspect of the present invention, wherein a suit and a rank are printed on one surface of a card base sheet, and a back pattern is printed on another surface, different sheet IDs for one card base sheet or each of a plurality of card base sheets are printed on the card base sheet, one deck or a plurality of decks are formed by individual cards cut by a cutting machine from the card base sheet, the one deck or the plurality of decks are shuffled by a shuffle machine to form a set of shuffled playing cards, different shuffled playing card IDs for each set are assigned to the shuffled playing card as ID codes, and the sheet ID of the playing card constituting the shuffled playing card and the shuffled playing card ID are associated with each other in a database.

In the shuffled playing card according to the aspect of the present invention, the sheet ID or the sheet IDs of the playing card constituting the shuffled playing card is specifiable from the shuffled playing card ID, and the shuffled playing card ID is singularly specifiable from the sheet ID.

In the shuffled playing card according to the aspect of the present invention, the sheet ID is printed on one or a plurality of shuffled playing cards constituting a set of decks.

In the shuffled playing card according to the aspect of the present invention, the sheet ID is printed with ink invisible under a normal condition.

In the shuffled playing card according to the aspect of the present invention, the sheet ID is printed with a transparent UV ink.

In the shuffled playing card according to the aspect of the present invention, the sheet ID of the card base sheet is associated with one or both of recording of a printing date on the card base sheet and recording of a cut date on the individual playing cards in the database.

In the shuffled playing card according to the aspect of the present invention, the sheet ID or the sheet IDs associated in the database are specifiable from the shuffled playing card ID, a printing plate of the suit and the rank used for the card base sheet is specifiable from the sheet ID, and if the individual cards are specified, a position or positions of the corresponding suit and rank on the card base sheet are specifiable.

In the shuffled playing card according to the aspect of the present invention, the sheet ID is printed on a site other than a card constituting the set of decks on the card base sheet, but the sheet ID or the sheet IDs associated in the database are specifiable from the shuffled playing card ID.

In the shuffled playing card according to the aspect of the present invention, the suits or the ranks corresponding to the plurality of decks are printed on one card base sheet, a common back pattern is printed on the other surface, and different sheet IDs for each deck are printed on the set of the plurality of decks, the sheet IDs for each deck of the playing card constituting the shuffled playing card are specifiable from the shuffled playing card ID, and the shuffled playing card ID is singularly specifiable from different sheet IDs for each deck.

There is provided a shuffled playing card according to an aspect of the present invention, wherein a suit and a rank are printed on one surface of a card base sheet, and a back pattern is printed on another surface, one or each of a plurality of card base sheets have different sheet IDs, one deck or a plurality of decks are formed by individual cards cut by a cutting machine from the card base sheet, the one deck or the plurality of decks are shuffled by a shuffle machine to form a set of shuffled playing cards, the sheet ID is printed on each of the individual cards, and the card base sheet is specifiable from the sheet ID printed on the individual card.

In the shuffled playing card according to the aspect of the present invention, different shuffled playing card IDs for each set are assigned to the shuffled playing card as ID codes, and the sheet ID of the playing card constituting the shuffled playing card and the shuffled playing card ID are associated with each other in a database.

In the shuffled playing card according to the aspect of the present invention, the sheet ID or the sheet IDs of the playing card constituting the shuffled playing card are specifiable from the shuffled playing card ID, and the shuffled playing card ID is singularly specifiable from the sheet ID.

In the shuffled playing card according to the aspect of the present invention, the sheet ID is printed with ink invisible under a normal condition.

In the shuffled playing card according to the aspect of the present invention, the sheet ID is printed with a transparent UV ink.

In the shuffled playing card according to the aspect of the present invention, the sheet ID of the card base sheet is associated with one or both of recording of a printing date on the card base sheet and recording of a cut date on the individual playing card in the database.

In the shuffled playing card according to the aspect of the present invention, the sheet ID or the sheet IDs associated in the database are specifiable from the shuffled playing card ID, a printing plate of the suit and the rank used for the card base sheet is specifiable from the sheet ID, and if the individual cards are specified, a position or positions of the corresponding suit and rank on the card base sheet are specifiable.

In the shuffled playing card according to the aspect of the present invention, the sheet ID is printed on a site other than a card constituting the set of decks on the card base sheet, but the sheet ID or the sheet IDs associated in the database are specifiable from the shuffled playing card ID.

In the shuffled playing card according to the aspect of the present invention, suits or ranks corresponding to the plurality of decks are printed on one card base sheet, a common back pattern is printed on another surface, and different sheet IDs for each deck are printed on the set of the plurality of decks, the sheet IDs for each deck of the playing card constituting the shuffled playing card are specifiable from the shuffled playing card ID, and the shuffled playing card ID is singularly specifiable from different sheet IDs for each deck.

A method of manufacturing a playing card according to an aspect of the present invention includes: a printing step of printing a suit and a rank on one surface of a card base sheet and printing a back pattern on another surface; a sheet ID assigning step of printing different sheet IDs for one card base sheet or each of a plurality of card base sheets on the card base sheet; and a cutting step of cutting the card base sheet having undergone the printing step and the sheet ID assigning step into individual cards by a cutting machine; a step of producing one deck or a plurality of decks from the card base sheet; a shuffling step of shuffling the one deck or the plurality of decks by a shuffle machine to produce a set of shuffled playing cards; a packaging step of packaging a set of shuffled playing cards having undergone the shuffling step; an ID assigning step of assigning a shuffled playing card ID as an ID code to the set of shuffled playing cards by generating different shuffled playing card IDs for each set of shuffled playing cards; and a database producing step of storing the shuffled playing card ID and the sheet ID assigned to the playing card constituting the shuffled playing card by associating the shuffled playing card ID and the sheet ID with each other in database.

In the method of manufacturing a playing card according to the aspect of the present invention, the sheet ID or the sheet IDs of the playing card constituting the shuffled playing card is specifiable from the shuffled playing card ID, and the shuffled playing card ID is singularly specifiable from the sheet ID.

In the method of manufacturing a playing card according to the aspect of the present invention, the sheet ID is printed on one or a plurality of shuffled playing cards constituting a set of decks.

In the method of manufacturing a playing card according to the aspect of the present invention, the sheet ID is printed with ink invisible under a normal condition.

In the method of manufacturing a playing card according to the aspect of the present invention, the sheet ID is printed with a transparent UV ink.

In the method of manufacturing a playing card according to the aspect of the present invention, in the database producing step, the sheet ID of the card base sheet is stored in the database in association with one or both of recording of a printing date on the card base sheet and recording of a cut date on the individual playing card.

In the method of manufacturing a playing card according to the aspect of the present invention, in the database producing step, before the shuffling step, the sheet ID read from the playing card constituting the set of decks is stored in the database in association with the shuffled playing card ID of the shuffled playing card to which the deck belongs.

In the method of manufacturing a playing card according to the aspect of the present invention, the sheet ID or the sheet IDs associated in the database are specifiable from the shuffled playing card ID, a printing plate of the suit and the rank used for the card base sheet is specifiable from the sheet ID, and if the individual cards are specified, a position or positions of the corresponding suit and rank on the card base sheet are specifiable.

In the method of manufacturing a playing card according to the aspect of the present invention, in the sheet ID assigning step, the sheet ID is printed on a site other than a card constituting the set of decks on the card base sheet, but the sheet ID or the sheet IDs associated in the database are specifiable from the shuffled playing card ID.

In the method of manufacturing a playing card according to the aspect of the present invention, in the printing step, the suits or the ranks corresponding to the plurality of decks are printed on one card base sheet, a common back pattern is printed on the other surface, and different sheet IDs for each deck are printed on the set of the plurality of decks, the sheet IDs for each deck of the playing card constituting the shuffled playing card are specifiable from the shuffled playing card ID, and the shuffled playing card ID is singularly specifiable from different sheet IDs for each deck.

BRIEF DESCRIPTION OF DRAWINGS

FIG. 8 is a diagram for describing database that stores the shuffled playing card ID and the sheet ID by associating the shuffled playing card ID with the sheet ID.

DETAILED DESCRIPTION

Figure 1A:
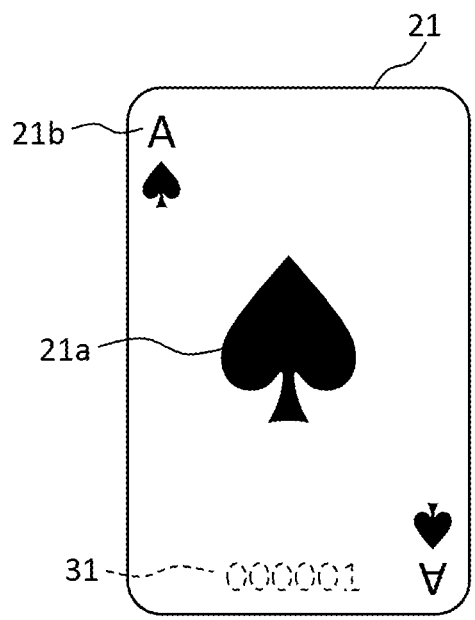
FIG. 1A is a diagram showing a front surface of a card constituting a set of decks among playing cards according to one embodiment.

Hereinafter, embodiments of the present invention will be described in detail with reference to the accompanying drawings. In the respective drawings, constituent elements having equivalent functions are denoted by the same reference numerals, and the detailed description of the constituent elements denoted by the same reference numerals is not repeated.

Figure 1B:
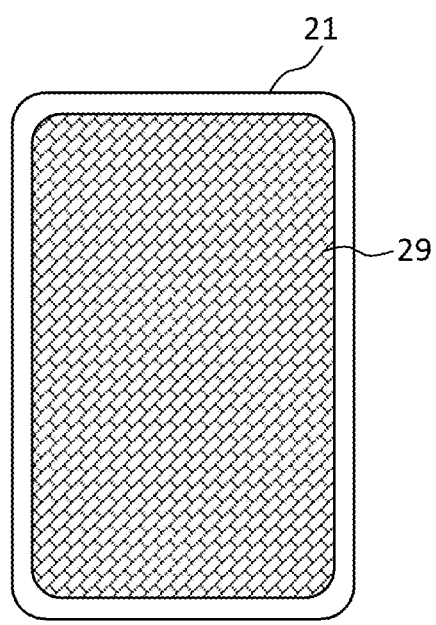
FIG. 1B is a diagram showing a back surface of the card.
Figure 2A:
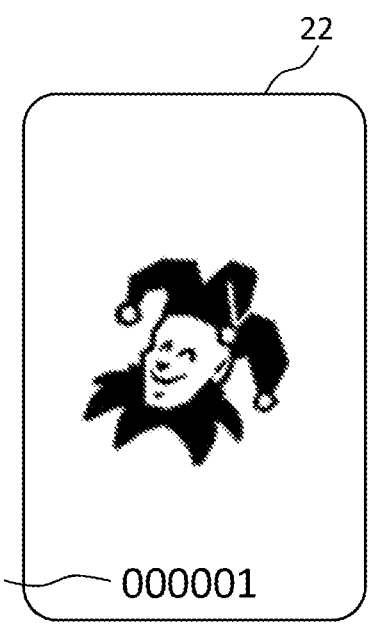
FIG. 2A is a diagram showing a front surface of a card other than the card constituting a set of decks among playing cards according to one embodiment.

FIG. 1A is a diagram showing a front surface of a card constituting a set of decks among playing cards according to one embodiment, and FIG. 1B is a diagram showing a back surface of the card. FIG. 2A is a diagram showing a front surface of a card other than the card constituting a set of decks among playing cards according to one embodiment, and FIG. 2B is a diagram showing a back surface of the card.

As shown in FIGS. 1A and 1B, a set of playing cards according to the present embodiment has 4×13=52 cards 21 which are constituted by a combination of four suits 21a (that is, spade, club, diamond, and heart) and 13 ranks 21b (that is, ace (A), 2, 3, 4, 5, 6, 7, 8, 9, 10, jack (J), queen (Q), and king (K)) as a card constituting a set of decks.

Figure 2B:
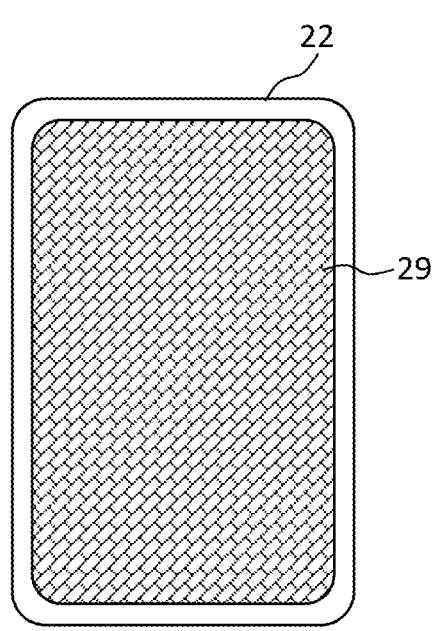
FIG. 2B is a diagram showing a back surface of the card.

In addition, as shown in FIGS. 2A and 2B, the set of playing cards according to the present embodiment further has a "joker" card 22 as a card other than the cards constituting the set of decks. The "joker" card 22 included in one set of playing cards may be one sheet or two sheets. The "joker" card 22 is a card which is removed and discarded before a shuffling process at the time of producing a shuffled playing card to be described later.

The set of playing cards 21 and 22 according to the present embodiment are formed by being individually cut from one card base sheet 20 (see FIG. 4) by a cutting machine.

As shown in FIGS. 1A and 1B and FIGS. 2A and 2B, common sheet IDs 31 and 32 are printed on front surfaces of each of the set of playing cards 21 and 22, and a common back pattern 29 is printed on a back side thereof. The sheet IDs 31 and 32 may be a character code including a plurality of figures, alphabets, or symbols, or may be a bar code or a two-dimensional code in which the character code is encoded.

As shown in FIGS. 1A and 1B, the sheet ID 31 printed on the card 21 constituting the set of decks may be printed with ink (for example, transparent UV ink) invisible to human eyes, or may be printed with ink (for example, black ink) visible to human eyes. When the sheet ID 31 is printed with ink (for example, transparent UV ink) invisible to human eyes, the appearance becomes similar to that of the conventional card, and thus a user of the card can use the card without feeling uncomfortable. On the other hand, when the sheet ID 31 is printed with ink (for example, black ink) visible to the human eyes, although there is a possibility that the user of the card may feel uncomfortable, the sheet ID 31 is simply an ID code, and therefore it does not cause special problems in the game.

In addition, as shown in FIGS. 2A and 2B, the sheet ID 32 printed on a card 22 other than the card constituting the set of decks may be printed with ink (for example, transparent UV ink) invisible to human eyes, or may be printed with ink (for example, black ink) visible to human eyes. When the card printed with ink (for example, black ink) visible to human eyes, a manufacturer can easily confirm the sheet ID 32 in the manufacturing process to be described later when inspecting quality of the printed card base sheet.

As shown in FIG. 8, the sheet IDs 31 and 32 printed on the respective playing cards 21 and 22 are stored in the database in association with one or both of recording of a printing date of the sheet ID on the original card base sheet 20 and recording of a cut date on the individual playing cards 21 and 22.

Figure 6:
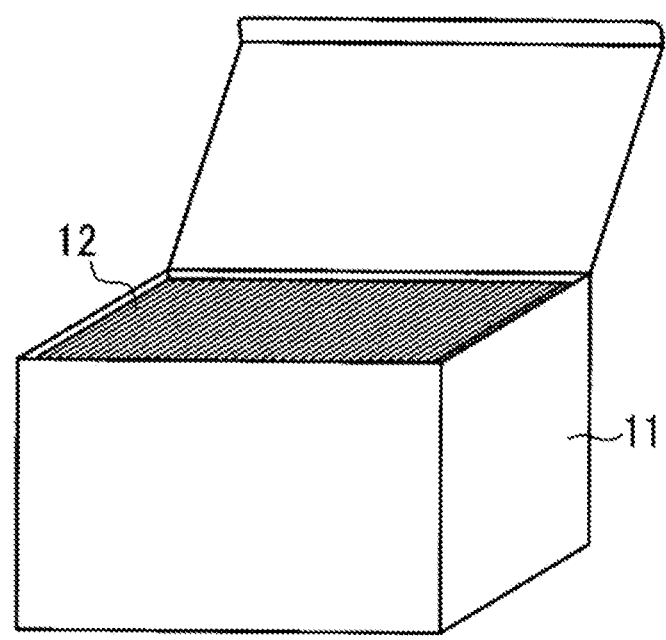
FIG. 6 is a diagram showing a shuffled playing card manufactured by the method of manufacturing a playing card according to one embodiment, and is a diagram showing the shuffled playing card before a lid of a package is sealed with a seal.
Figure 7:
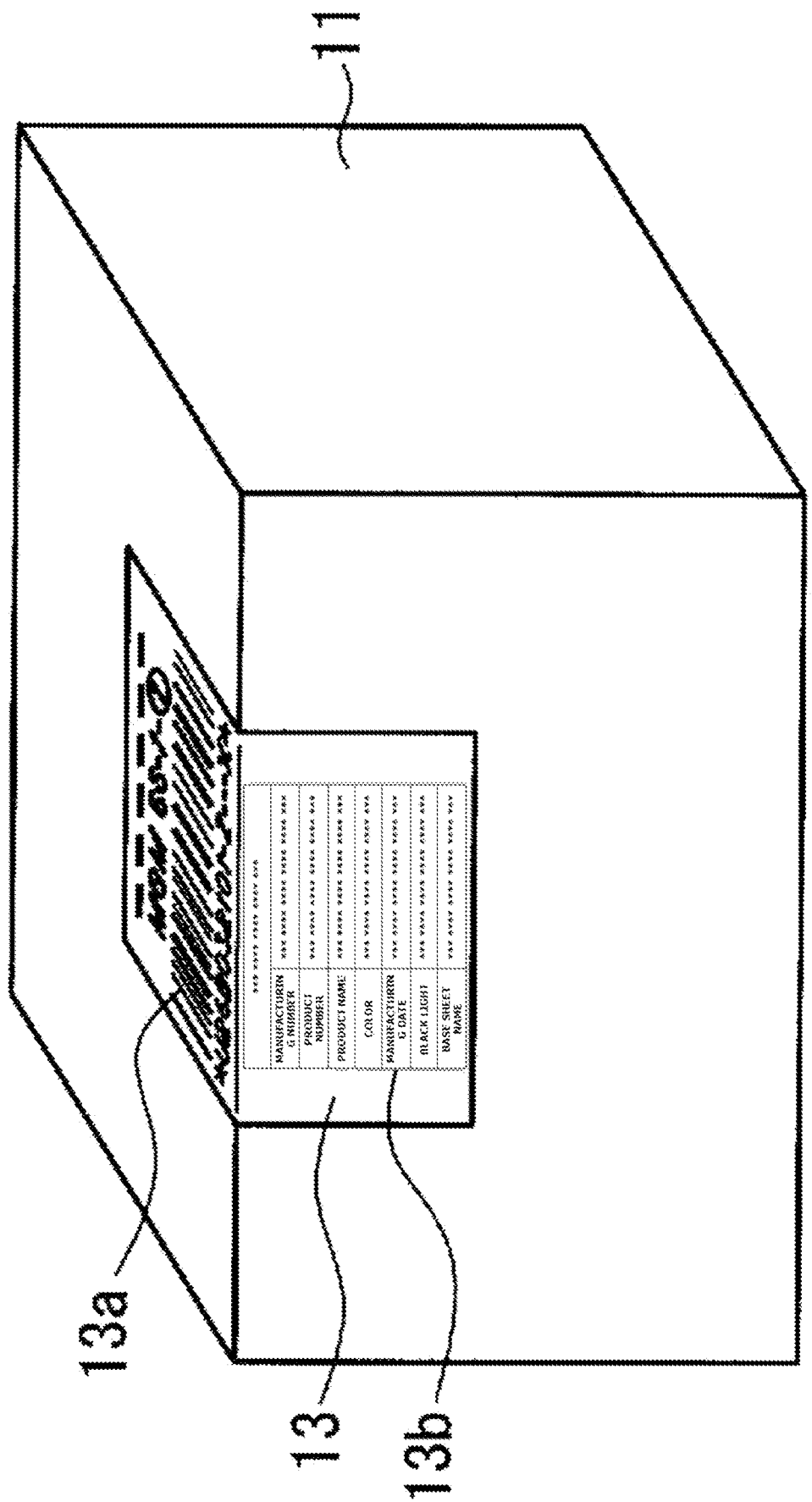
FIG. 7 is a diagram showing the shuffled playing card according to one embodiment, and is a diagram showing the shuffled playing card in which a shuffled playing card ID is assigned to the seal for sealing the lid of the package.

FIG. 6 is a diagram showing a shuffled playing card according to the present embodiment, and is a diagram showing the shuffled playing card before a package is sealed with a seal. FIG. 7 is a diagram showing the shuffled playing card according to the present embodiment, and is a diagram showing the shuffled playing card in which a shuffled playing card ID is assigned to the seal for sealing the package.

The shuffled playing card 12 according to the present embodiment is a card in which a plurality of decks (for example, four decks or eight decks) of the above-described playing card 21 are one set, and is sufficiently shuffled by a shuffle machine. In the shuffled playing card 12, different shuffled playing card IDs 13a are assigned as ID codes for each set. In the shown example, the shuffled playing card 12 is housed in a box-shaped package 11 and a lid thereof is sealed with a seal 13. The shuffled playing card ID 13a is encoded as a bar code and printed on the seal 13 which seals the package 11.

As shown in FIG. 8, the sheet ID 31 of the playing card 21 constituting the shuffled playing card 12 and the shuffled playing card ID 13a are stored in the database in association with each other.

Figure 3:
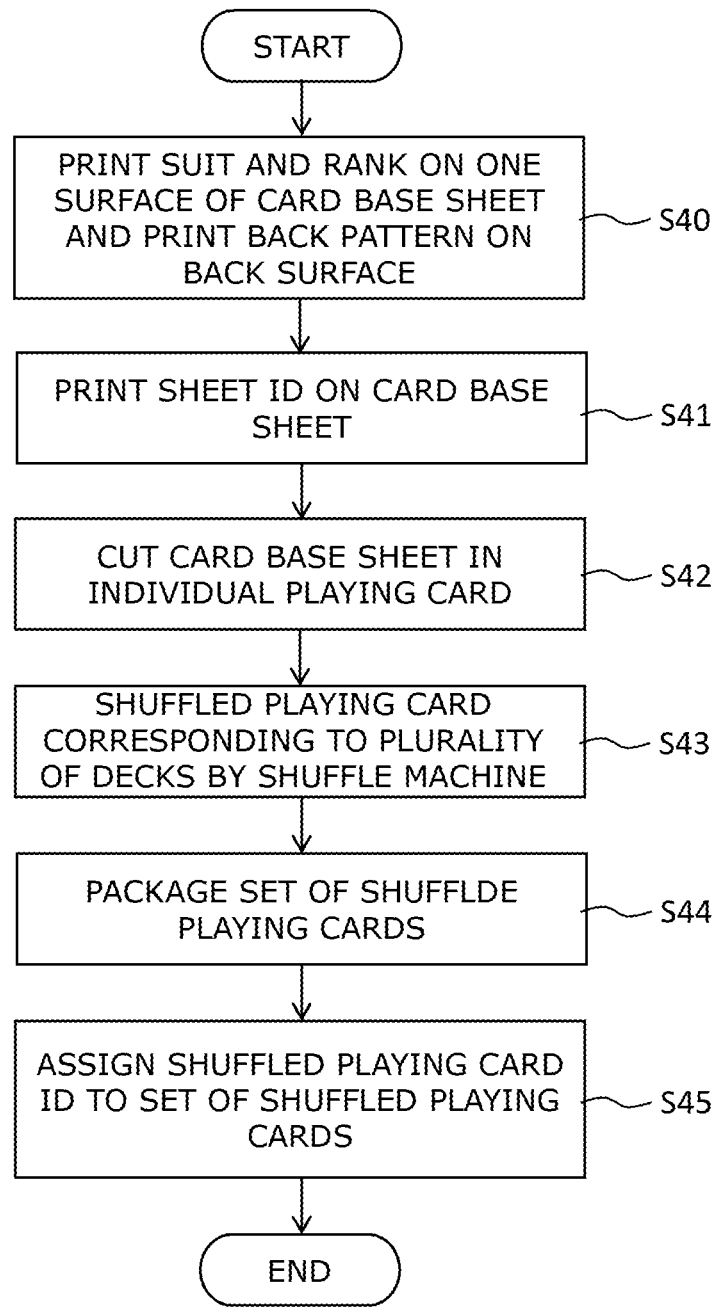
FIG. 3 is a flowchart for describing a method of manufacturing a playing card according to one embodiment.

Next, a method of manufacturing a playing card 21 and a shuffled playing card 12 according to the present embodiment will be described. FIG. 3 is a flowchart showing a method of manufacturing a playing card 21 and a shuffled playing card 12 according to the present embodiment.

In the manufacturing process of the playing card 21 and the shuffled playing card 12 according to the present embodiment, it is preferable for a process management system to consistently perform process management from order to shipment. In the present embodiment, a manufacturing method using such a process management system will be described.

Figure 4:
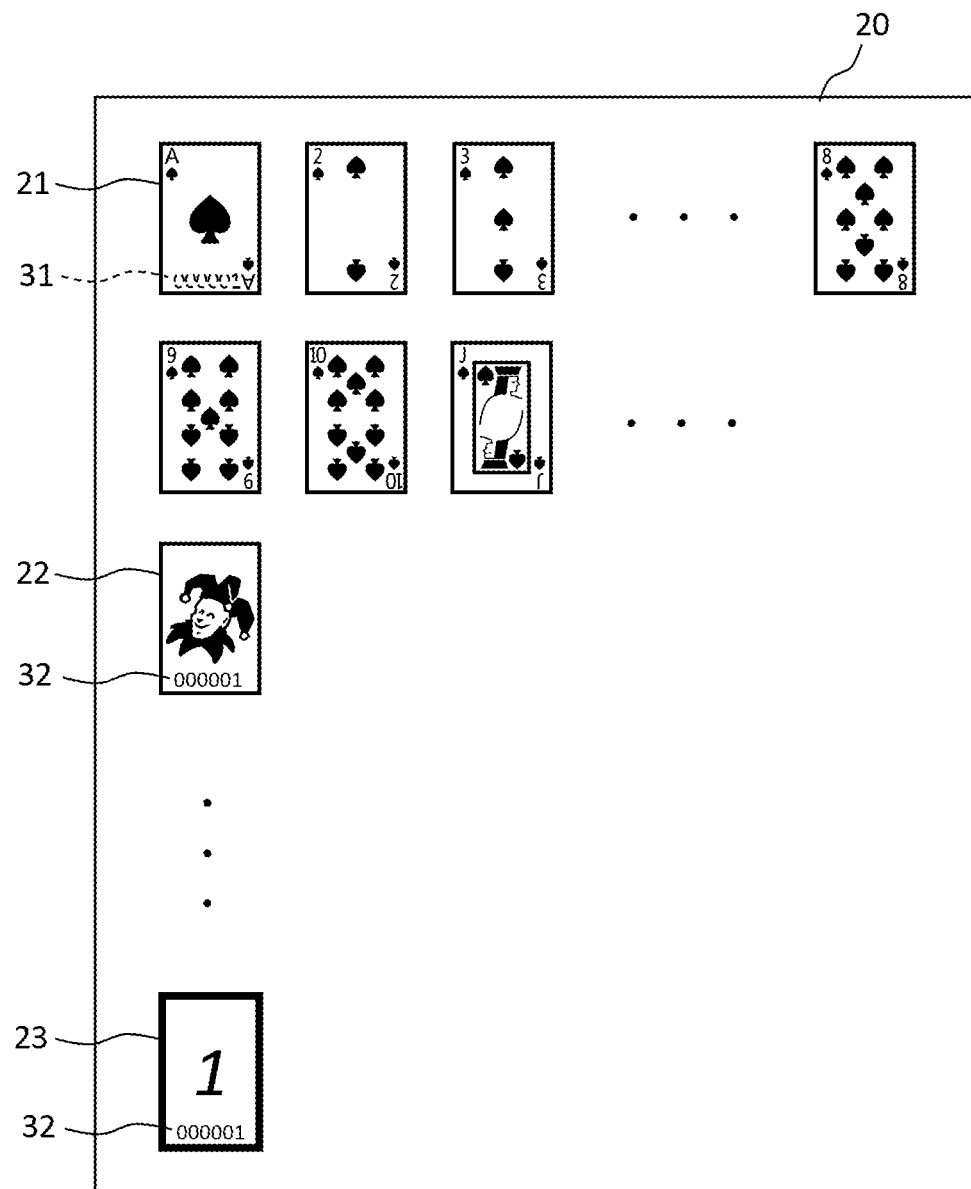
FIG. 4 is a diagram showing a card base sheet used in the method of manufacturing a playing card according to one embodiment, and is a diagram showing a card base sheet on which a sheet ID is printed.

As shown in FIGS. 3 and 4, first, as a printing process, a printing machine prints a suit and a rank on the front surface of the card base sheet 20, and prints a back pattern on a back surface thereof (step S40). In the shown example, a total of 56 cards including 52 cards 21 including a combination of four suits and 13 ranks, one "joker" card 22, and three other cards 23 are printed in a matrix arrangement of 8 rows×7 columns.

Figure 5:
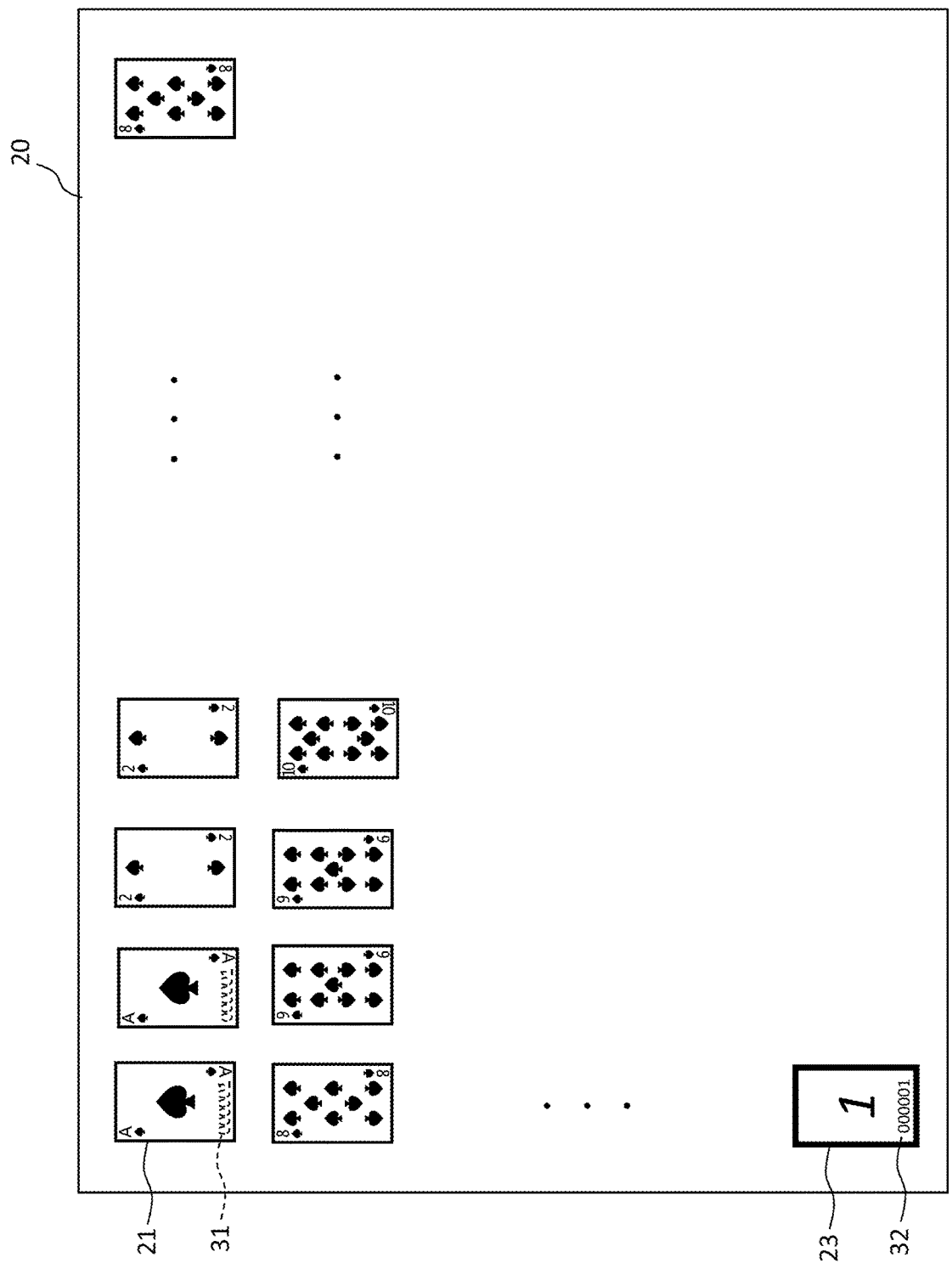
FIG. 5 is a diagram showing a card base sheet used in the method of manufacturing a playing card according to one embodiment, and is a diagram showing a modification of a card base sheet on which a sheet ID is printed.

As one modification, as shown in FIG. 5, a total of 105 cards including two decks of 52 cards 21 including a combination of four suits and 13 ranks and one other card 23 may be printed in a matrix arrangement of 7 rows×15 columns.

Next, as a sheet ID assigning step, the process management system assigns different sheet IDs to each card base sheet or the plurality of card base sheets and the printing machine prints the sheet IDs 31 and 32 on the front surface of the card base sheet 20 (step S41). In addition, by the process management system, the sheet IDs 31 and 32 and the printing dates of the sheet IDs 31 and 32 on the card base sheet 20 are stored in the database in association with each other (see FIG. 8). Although not shown in the drawing, the sheet IDs 31 and 32 may be stored in the database in association with one or two or more of a factory name, a manufacturing line, a customer name (casino name).

In the present embodiment, the sheet ID 31 is printed on the card 21 constituting a set of decks with ink (for example, transparent UV ink) invisible to human eyes. As a result, the card 21 constituting the set of decks has the same appearance as a conventional card, and thus the user of the card can use the card without feeling uncomfortable. It should be noted that the sheet ID 31 may be printed only on a specific card (for example, spade A) among the cards 21 constituting the set of decks, or may be printed on all the cards.

On the other hand, the sheet ID 32 is printed on the cards 22 and 23 other than the card constituting the set of decks with ink (for example, black ink) visible to human eyes. As a result, when the manufacturer can easily confirm the sheet ID when inspecting the quality of the printed card base sheet.

In the present embodiment, the sheet ID assigning process (step S41) is performed after the printing process (step S40), but the present embodiment is not limited thereto, and the printing process (step S40) may be performed after the sheet ID assigning process (step S41).

Next, the card base sheet 20 having undergone the printing process (step S40) and the sheet ID assigning process (step S41) is cut into individual cards 21, 22, and 23 by the cutting machine (step S42). By removing cards 22 and 23 other than the cards constituting the set of decks from the cut card, the playing card 21 corresponding to one deck (corresponding to two decks from the card base sheet 20 shown in FIG. 5) is produced.

The sheet ID 31 is read from the playing card 21 constituting the set of decks by the process management system before being shuffled or during being shuffled by the shuffle machine to be described later and is stored in the database in association with the shuffle machine (or shuffle machine group) and shuffled date and time (see FIG. 8).

Next, as the shuffling process, the plurality of decks (for example, four decks or eight decks) of playing card 21 are shuffled by the shuffle machine, and the set of shuffled playing cards 12 is produced (step S43). As the shuffle machine, for example, the shuffle machine described in WO 2009/069708 can be used.

Next, the set of shuffled playing cards 12 which has undergone the shuffling process (step S43) is packaged by a packaging machine (step S44). In the present embodiment, as shown in FIG. 6, the set of shuffled playing cards 12 is housed in the box-shaped package 11. The material of the package 11 is not particularly limited, and may be paper or a resin film. As shown in FIG. 7, the lid of the package 11 is sealed with the seal 13.

Next, different shuffled playing card IDs are generated for each set of shuffled playing cards by the process management system, and the shuffled playing card ID 13a is assigned to the set of shuffled playing cards 12 as the ID code (step S45). In the shown example, the shuffled playing card ID 13a is encoded as the bar code and is printed on the seal 13 sealing the lid of the package 11 by the printing machine.

In the shown example, in addition to the shuffled playing card ID 13a, a specification table 13b is printed on the seal 13. For example, arbitrary information such as a manufacturing number, a product number, a product name, a color, and a manufacturing date of the shuffled playing card is described in the specification table 13b.

Further, by the process management system, the sheet ID 31 read from the playing card 21 constituting the set of decks before the shuffling process (step S43) is stored in the database in association with the shuffled playing card ID 13a of the set of shuffled playing cards 12 to which the deck belongs (see FIG. 8). In the shown example, the set of shuffled playing cards 12 are configured from the playing cards 21 corresponding to four decks, and four sheet IDs 31 are stored in the database in association with each shuffled playing card ID 13a.

According to the present embodiment, since the card base sheet 20 on which the different sheet IDs 31 and 32 are printed for one card base sheet or each of the plurality of card base sheets is cut to produce the playing card 21 of one deck or a plurality of decks, it is possible to confirm, on the database, the information on when the card is printed and also when the card is inspected by tracing back through the distribution history of the playing card 21. As a result, it is possible to confirm whether the playing card is a genuine product correctly manufactured and distributed by reading the sheet ID 31 from the contents of the card to confirm the history on the database in units of sheet even if the contents of the packaged shuffled playing card 12 are replaced with a set of cards whose arrangement is known by malicious fraudulent players.

In addition, by printing different sheet IDs 31 and 32 for each card base sheet or the plurality of card base sheets, the ID management of the card base sheet 20 in the factory becomes possible. For example, even when the card base sheet 20 is discarded halfway, it is possible to manage at which step the playing card is discarded in the database. In this way, it is possible to grasp a yield in each process at the manufacturing stage. In addition, it will be able to be understood whether the card of the card base sheet which is determined to be defective in each process and thus discarded is inadvertently mixed in goods (that is, it will be able to be understood whether only cards of good card base sheet are used for goods). In addition, even if malicious fraudulent players illegally obtain the discarded card base sheet 20 and cut the obtained card base sheet by themselves to produce a counterfeit card and bring the produced counterfeit card for use in a game, the sheet ID 31 is read from the card to confirm the history on the database, thereby making it possible to easily detect that the playing card is a counterfeit card and enhance the security of the game.

In addition, in the above-described embodiment, in the sheet ID assigning step, as shown in FIGS. 6 and 7, the sheet IDs 31 and 32 are printed on a part of the card base sheet 20 on which the cards 21 to 23 are printed, but the present embodiment is not limited thereto, and the sheet ID may also be printed on a part of the card base sheet 20 on which the card is not printed. In this case, it is possible to acquire the sheet ID from the remaining part (so-called punching scrap) after removing the cards 21 to 23 from the card base sheet 20.

The above-described embodiments are described for the purpose of enabling those skilled in the art to which the present invention belongs to implement the present invention. Various modifications of the above embodiments are obvious to those skilled in the art, and the technical idea of the present invention can be applied to other embodiments. Accordingly, the present invention is not limited to the embodiments described, but should be the broadest scope in accordance with the technical idea defined by the claims.

What is claimed:

1. A playing card set that includes one or more decks of playing cards, wherein:
the playing card set is assigned a playing card set ID by which the playing card set is distinguishable from other playing card sets;
each of the playing cards of the playing card set is assigned and has printed thereon an on-card printed ID that is different than each on-card printed ID that is assigned to any playing card of the other playing card sets; and
the on-card printed ID of the playing cards of the playing card set and the playing card set ID of the playing card set are associated with each other in a database so that, for each of the playing cards of the playing card set, the playing card set is uniquely identifiable from the on-card printed ID to thereby determine that the respective card belongs to the playing card set.

2. The playing card set according to claim 1, wherein the on-card printed ID is printed with ink that is invisible under visible light.

3. The playing card set according to claim 2, wherein the ink with which the on-card printed ID is printed is a transparent UV ink.

4. The playing card set according to claim 1, wherein the database further associates the on-card printed ID with information regarding a manufacture of the respective playing card to which the on-card printed ID is assigned.

5. The playing card set according to claim 4, wherein the information regarding the manufacture includes one or more of:
a printing date of the playing card;
a cut date of the playing card;
a factory name of the playing card;
a manufacturing line of the playing card; and
a casino name of the playing card.

6. The playing card set according to claim 1, wherein whether a respective playing card is genuine is determinable based on whether an on-card printed ID that is printed on the respective playing card is included in the database.

7. The playing card set according to claim 1, wherein the one or more decks includes a plurality of decks, and the on-card printed ID assigned to the playing cards of the playing card set includes a respective on-card printed ID that each is assigned to, and is printed on all of the playing cards of, a respective deck of the plurality of decks.

8. The playing card set according to claim 1, wherein the on-card printed ID assigned to the playing cards of the playing card set includes a plurality of on-card printed IDs that each is different from each and every on-card printed ID assigned to the any of the playing cards of the other playing card sets.

9. The playing card set according to claim 1, wherein the on-card printed ID assigned to the playing cards of the playing card set is a single common on-card printed ID that is assigned to all of the playing cards of the playing card set.

10. The playing card set according to claim 1, wherein the playing card set is in a shuffled state and packaged in a package.

11. A method comprising:
producing a plurality of decks of playing cards;
packaging one or more of the plurality of decks of playing cards as a playing card set;
printing on each of the playing cards of the playing card set any of one or more on-card printed IDs that are assigned to the playing cards of the playing card set and that are each different than each on-card printed ID that is assigned to playing cards of other playing card sets;
assigning to the playing card set a playing card set ID by which the playing card set is distinguishable from each of the other playing card sets; and
producing a database in which the on-card printed ID of the playing cards of the playing card set and the playing card set ID of the playing card set are associated with each other.

12. The method according to claim 11, further comprising shuffling the one or more of the plurality of decks of playing cards before the packaging.

13. The method according to claim 11, wherein the on-card printed ID is printed with ink that is invisible under visible light.

14. The method according to claim 13, wherein the on-card printed ID is printed with a transparent UV ink.

15. The method according to claim 11, wherein the producing of the database includes associating, in the database, the on-card printed ID with information regarding a manufacture of the respective playing card to which the on-card printed ID is assigned.

16. The method according to claim 15, wherein the information regarding the manufacture includes one or more of:
a printing date of the playing card;
a cut date of the playing card;
a factory name of the playing card;
a manufacturing line of the playing card; and
a casino name of the playing card.

* * * * *